(12) United States Patent
Chang

(10) Patent No.: US 8,885,748 B2
(45) Date of Patent: Nov. 11, 2014

(54) MULTIPLE INPUTS AND MULTIPLE OUTPUTS WIRELESS COMMUNICATION SYSTEM WITH EXPANSION MODULE

(75) Inventor: Lee-Chuan Chang, Zhudong Township (TW)

(73) Assignee: Transystem Inc., Hsinchu (TW)

( * ) Notice: Subject to any disclaimer, the term of this patent is extended or adjusted under 35 U.S.C. 154(b) by 457 days.

(21) Appl. No.: 13/316,656

(22) Filed: Dec. 12, 2011

(65) Prior Publication Data

US 2013/0094601 A1   Apr. 18, 2013

(30) Foreign Application Priority Data

Oct. 12, 2011   (TW) .............................. 100136998 A

(51) Int. Cl.
*H04B 7/10* (2006.01)
(52) U.S. Cl.
CPC ........................................ *H04B 7/10* (2013.01)
USPC ............................. 375/267; 375/260; 375/259
(58) Field of Classification Search
CPC ....................................................... H04B 7/10
USPC ......................................... 375/267, 260, 259
See application file for complete search history.

(56) References Cited

U.S. PATENT DOCUMENTS

| 5,982,242 | A * | 11/1999 | Jun et al. .......................... 331/49 |
| 7,139,324 | B1 * | 11/2006 | Ylitalo et al. ................... 375/267 |
| 7,570,932 | B1 * | 8/2009 | Folkmann ................... 455/127.1 |
| 2002/0158801 | A1 * | 10/2002 | Crilly et al. .................... 342/378 |
| 2003/0123565 | A1 * | 7/2003 | Fukuda et al. ................ 375/267 |
| 2008/0268797 | A1 * | 10/2008 | Ahn et al. .................. 455/127.1 |

* cited by examiner

*Primary Examiner* — Michael Neff
(74) *Attorney, Agent, or Firm* — Maschoff Brennan

(57) ABSTRACT

A wireless communication system with multiple inputs and multiple outputs for simultaneously transmitting or receiving a plurality of sub-signals with a first direction of polarization or a second direction of polarization is disclosed. The system includes N antennas, an expansion module and N signal processors. The expansion module is connected to each of the antennas and each of the signal processors, to be selectively operated under a receiving mode or a transmitting mode, for integrating or allocating the sub-signal with the first direction of polarization corresponding to one of the antennas and the sub-signal with the second direction of polarization corresponding to another antenna, based on control signals provided by each of the signal processors. Accordingly, the system can expand the number of input and output interfaces by twice without additional and complete components for receiving or transmitting.

10 Claims, 2 Drawing Sheets

MULTIPLE INPUTS AND MULTIPLE OUTPUTS WIRELESS COMMUNICATION SYSTEM WITH EXPANSION MODULE

CROSS-REFERENCE TO RELATED APPLICATIONS

This non-provisional application claims priority under 35 U.S.C. §119(a) on Patent Application No(s). 100136998 filed in Taiwan, R.O.C. on Oct. 12, 2011, the entire contents of which are hereby incorporated by reference.

BACKGROUND

1. Technical Field

The disclosure relates to a communication system and more particularly to a multiple input and multiple output wireless communication system with an expansion module.

2. Related Art

Under the flourishing development of broadband wireless communication technology, multiple input and multiple output (MIMO) technology is used for WiFi, Wimax as well as LTE to enhance communication capacity. In a common N×N MIMO communication system, each antenna interface has a complete receiving and transmitting system allocated, and each of the complete receiving and transmitting system at least includes a radio frequency (RF) front end module, a modulator and a demodulator, a baseband processing module and a media access controller (MAC).

Common commercial system-on-a-chip has developed to a stage that, the modulators, the demodulators, the baseband processing modules and the media access controllers (MACs), and even the radio frequency (RF) front end modules required for 3×3 MIMO system are integrated into a single chip, providing users a solution with powerful functions at low costs. As the number N of MIMO interfaces increases, the entire N×N MIMO system becomes more complicated. Therefore, 3×3 MIMO system is the most advanced level infrastructure seen presently measured by commercial application and mass production as standards. However, the number of the antenna interfaces of the 3×3 MIMO system is no longer qualified to meet the requirements of special applications. High level N×N MIMO system not only can enhance system communication capacity, but can also offer capabilities common communication system can not provide if the features of multiple inputs and multiple outputs are properly used. But the problems of system complexity and increased costs arise, so products being embodied practically are mostly limited to low antenna interface number.

SUMMARY

A multiple input and multiple output wireless communication system provided by the present disclosure can simultaneously transmit or receive two sets of sub-signals with different polarizations, the system comprises N antennas, an expansion module and a data processing unit.

The N antennas are used for simultaneously transmitting or receiving N sub-signals with a first direction of polarization and N sub-signals with a second direction of polarization, N is a constant bigger than 1. The expansion module is connected to each of the antennas to provide N first signal channels for the sub-signals with the first direction of polarization, and N second signal channels for the sub-signals with the second direction of polarization. The data processing unit is connected to the expansion module to provide N control signals for the expansion module, so that the expansion module can be selectively operated under a receiving mode or a transmitting mode. The data processing unit further includes N signal processors for processing corresponding sub-signals.

Accordingly, a number of the signal channels is twice of the antennas for expanding the MIMO system. By employing switchers, components required for transmitting ends and receiving ends can be shared, so that complexity of the system infrastructure is reduced. Furthermore, a simplified combination of the radio frequency (RF) front end modules is used to process the sub-signals received, so that N independent airspaces can be divided for the antennas.

The structure and the technical means adopted by the present disclosure to achieve the above and other objects can be best understood by referring to the following detailed description of the preferred embodiments and the accompanying drawings.

DETAILED DESCRIPTION

In view of the abovementioned, the present disclosure provides a wire communication system to solve the problem that infrastructure of conventional wireless communication system becomes overly complicated because of expansion of signal channels.

Figure 1:
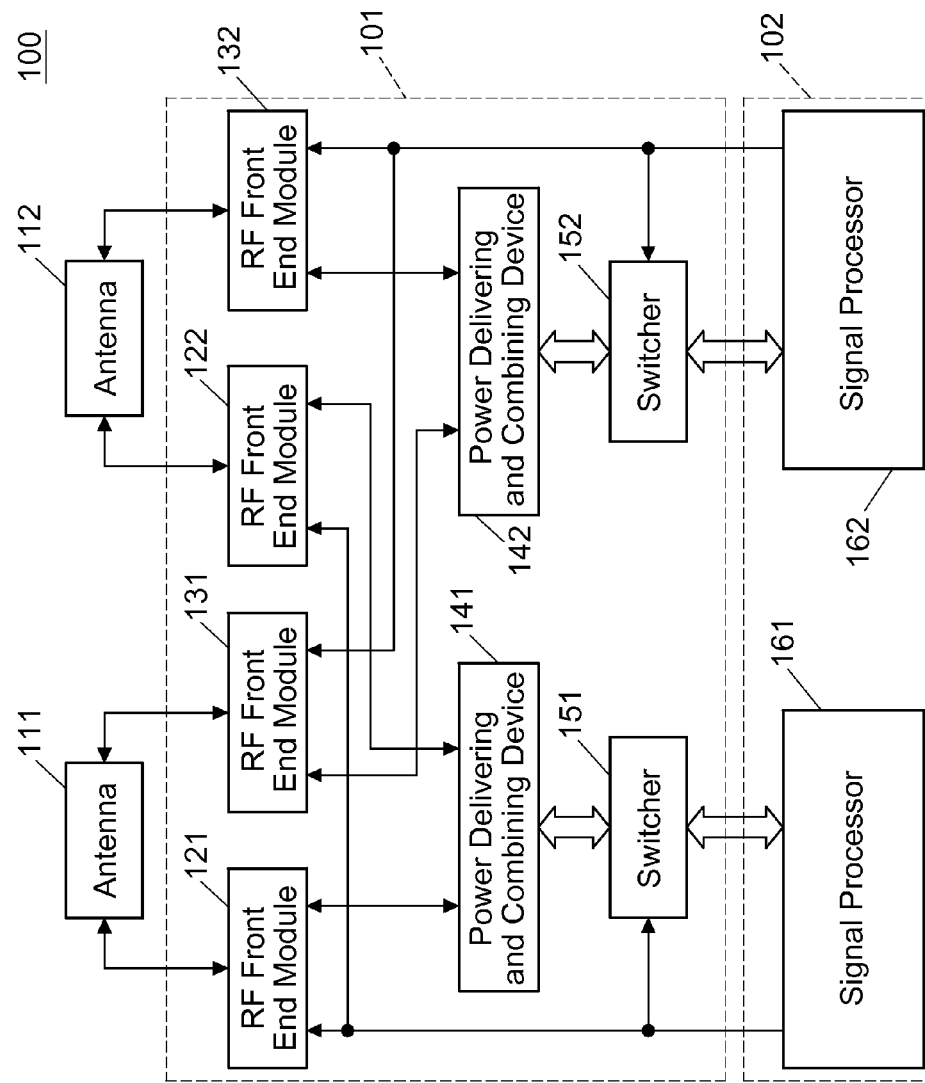
FIG. 1 is an illustration of a structure of a wireless communication system of an embodiment according to the present disclosure.

Referring to FIG. 1, it shows a structure of a wireless communication system of an embodiment. A wireless communication system 100 comprises antennas 111 and 112, an expansion module 101 and a data processing unit 102, for simultaneously transmitting or receiving sub-signals of different directions of polarization, such as sub-signals of vertical orthogonal polarization and horizontal orthogonal polarization.

Each of the antennas 111 and 112 has two interfaces; each interface receives or transmits sub-signals via a type of signal channel. In an embodiment, one of the signal channels simultaneously transmits or receives sub-signals of vertical orthogonal polarization, while another one of the signal channels simultaneously transmits or receives sub-signals of horizontal orthogonal polarization. The antennas 111 and 112 are dual port orthogonal polarized antennas.

In an embodiment, the expansion module 101 includes radio frequency (RF) front end modules 121, 122, 131 and 132, power dividing and combining devices 141 and 142, as well as switchers 151 and 152. The radio frequency (RF) front end modules 121 and 131 are connected to the antenna 111, the radio frequency (RF) front end modules 122 and 132 are connected to the antenna 112, for selectively processing corresponding sub-signals. The radio frequency (RF) front end modules 121 and 122 are corresponding to a type of signal channel, while the radio frequency (RF) front end modules 131 and 132 are corresponding to another type of signal channel. Each of the RF front end modules includes a power amplifier (not illustrated), a low-noise amplifier (not illustrated) and a receiving and transmitting switcher (not illustrated).

In an embodiment, the radio frequency (RF) front end module 121 selectively processes sub-signals of vertical orthogonal polarization, the radio frequency (RF) front end module 122 selectively processes sub-signals of horizontal orthogonal polarization; the radio frequency (RF) front end module 131 selectively processes sub-signals of horizontal orthogonal polarization, the radio frequency (RF) front end module 132 selectively processes sub-signals of vertical orthogonal polarization.

In another embodiment of the present disclosure, the radio frequency (RF) front end module 121 selectively processes sub-signals of horizontal orthogonal polarization, the radio frequency (RF) front end module 122 selectively processes sub-signals of vertical orthogonal polarization; the radio frequency (RF) front end module 131 selectively processes sub-signals of vertical orthogonal polarization, the radio frequency (RF) front end module 132 selectively processes sub-signals of horizontal orthogonal polarization.

The power dividing and combining device 141 provides two interfaces to connect to the radio frequency (RF) front end modules 121 and 122, for receiving and integrating the sub-signals provided by the radio frequency (RF) front end modules 121 and 122, or for allocating the signals to be transmitted to the radio frequency (RF) front end modules 121 and 122; while the power dividing and combining device 142 provides two interfaces to connect to the radio frequency (RF) front end modules 131 and 132, for receiving and integrating the sub-signals provided by the radio frequency (RF) front end modules 131 and 132, or for allocating the signals to be transmitted to the radio frequency (RF) front end modules 131 and 132. The radio frequency (RF) front end modules 121, 122, 131 and 132 can also compensate for received or transmitted sub-signal loss produced by passing the power dividing and combining devices 141 and 142.

The switcher 151 is connected to the power dividing and combining device 141, while the switcher 152 is connected to the power dividing and combining device 142, for selectively transmitting or receiving the corresponding sub-signals. The data processing unit 102 is connected to the switchers 151 and 152 for delivering signals to be transmitted to the switchers 151 and 152, or for processing the sub-signals received via the switchers 151 and 152, such as conversion of fundamental signals.

Furthermore, the data processing unit 102 includes signal processors 161 and 162 for processing the sub-signals received. The signal processors 161 and 162 also provide control signals to the switchers 151 and 152 as well as the radio frequency (RF) front end modules 121, 122, 131 and 132, in order to control the switchers 151 and 152 as well as the radio frequency (RF) front end modules 121, 122, 131 and 132, to selectively switch for transmitting or receiving the sub-signals. The signal processor 161 is connected to the switcher 151 for processing the sub-signals received from the switcher 151, or for transferring the sub-signals to the switcher 151, and for providing a control signal to the switcher 151 and the radio frequency (RF) front end modules 121 and 122, in order to control receiving or transmitting of the sub-signals. The signal processor 162 is connected to the switcher 152 for processing the sub-signals received from the switcher 152, or for transferring the sub-signals to the switcher 152, and for providing a control signal to the switcher 152 and the radio frequency (RF) front end modules 131 and 132, in order to control receiving or transmitting of the sub-signals.

When the wireless communication system 100 is operated under a receiving mode, from the environment electric waves, the antennas 111 and 112 synchronously receive two types of radio frequency signals with different polarizations. The, the antennas 111 and 112 transfer them to the radio frequency (RF) front end modules 121, 122, 131 and 132 respectively.

In an embodiment, the receiving and transmitting switchers of the radio frequency (RF) front end modules 121 and 122 are switched to a receiving mode based on a control signal provided by the signal processor 161, so that the low-noise amplifiers of the radio frequency (RF) front end modules 121 and 122 operate, and the radio frequency (RF) front end module 121 receives sub-signals of vertical orthogonal polarization via the antenna 111, then transfers them to the power dividing and combining device 141, and that the radio frequency (RF) front end module 122 receives sub-signals of horizontal orthogonal polarization via the antenna 112, then transfers them to the power dividing and combining device 141.

On the other hand, the receiving and transmitting switchers of the radio frequency (RF) front end modules 131 and 132 are switched to a receiving mode based on a control signal provided by the signal processor 162, so that the low-noise amplifiers of the radio frequency (RF) front end modules 131 and 132 operate, and the radio frequency (RF) front end module 131 receives sub-signals of horizontal orthogonal polarization via the antenna 111, then transfers them to the power dividing and combining device 142, and that the radio frequency (RF) front end module 132 receives sub-signals of vertical orthogonal polarization via the antenna 112, then transfers them to the power dividing and combining device 142.

The power dividing and combining devices 141 and 142 respectively integrate the sub-signals of vertical and horizontal orthogonal polarizations, and respectively transfer them to the switchers 151 and 152. The switchers 151 and 152 are switched to a receiving mode based on control signals provided by the data processing unit 102; then transfer the sub-signals to the signal processors 161 and 162 respectively.

In another embodiment, the receiving and transmitting switchers of the radio frequency (RF) front end modules 121 and 122 are switched to a receiving mode based on control signals provided by the signal processor 161, so that the low-noise amplifiers of the radio frequency (RF) front end modules 121 and 122 operate, and the radio frequency (RF) front end module 121 receives sub-signals of horizontal orthogonal polarization via the antenna 111, then transfers them to the power dividing and combining device 141, and that the radio frequency (RF) front end module 122 receives sub-signals of vertical orthogonal polarization via the antenna 112, then transfers them to the power dividing and combining device 141.

On the other hand, the receiving and transmitting switchers of the radio frequency (RF) front end modules 131 and 132 are switched to a receiving mode based on control signals provided by the signal processor 162, so that the low-noise amplifiers of the radio frequency (RF) front end modules 131 and 132 operate, and the radio frequency (RF) front end module 131 receives sub-signals of vertical orthogonal polarization via the antenna 111, then transfers them to the power dividing and combining device 142, and that the radio frequency (RF) front end module 132 receives sub-signals of horizontal orthogonal polarization via the antenna 112, then transfers them to the power dividing and combining device 142.

The power dividing and combining devices 141 and 142 respectively integrate the sub-signals of vertical and horizontal orthogonal polarizations, and respectively transfer them to the switchers 151 and 152. The switchers 151 and 152 are switched to a receiving mode based on control signals provided by the data processing unit 102, and then transfer the integrated sub-signals to the signal processors 161 and 162 respectively.

When the wireless communication system 100 is operated under a transmitting mode, the data processing unit 102 transfers the sub-signals to be transmitted to the switchers 151 and 152 respectively. In addition, the wireless communication system 100 controls the switchers 151 and 152 to switch to a transmitting mode, in order to transfer the sub-signals to be transmitted to the power dividing and combining devices 141 and 142.

In an embodiment, the power dividing and combining devices 141 transfer output signal of signal processor 161 to the radio frequency (RF) front end modules 121 and 122, and 142 transfer the output signal of signal processor 162 to the radio frequency (RF) front end modules 131 and 132. The receiving and transmitting switchers of the radio frequency (RF) front end modules 121 and 131 are switched to a transmitting mode based on control signals provided by the signal processor 161 and 162, so that the sub-signals are amplified by the power amplifier. The two sub-signals are then transferred to the antenna 111 for transmitting. The receiving and transmitting switchers of the radio frequency (RF) front end modules 122 and 132 are switched to a transmitting mode based on control signals provided by the signal processor 161 and 162, so that the sub-signals are amplified by the power amplifier. The two sub-signals are then transferred to the antenna 112 for transmitting.

Figure 2:
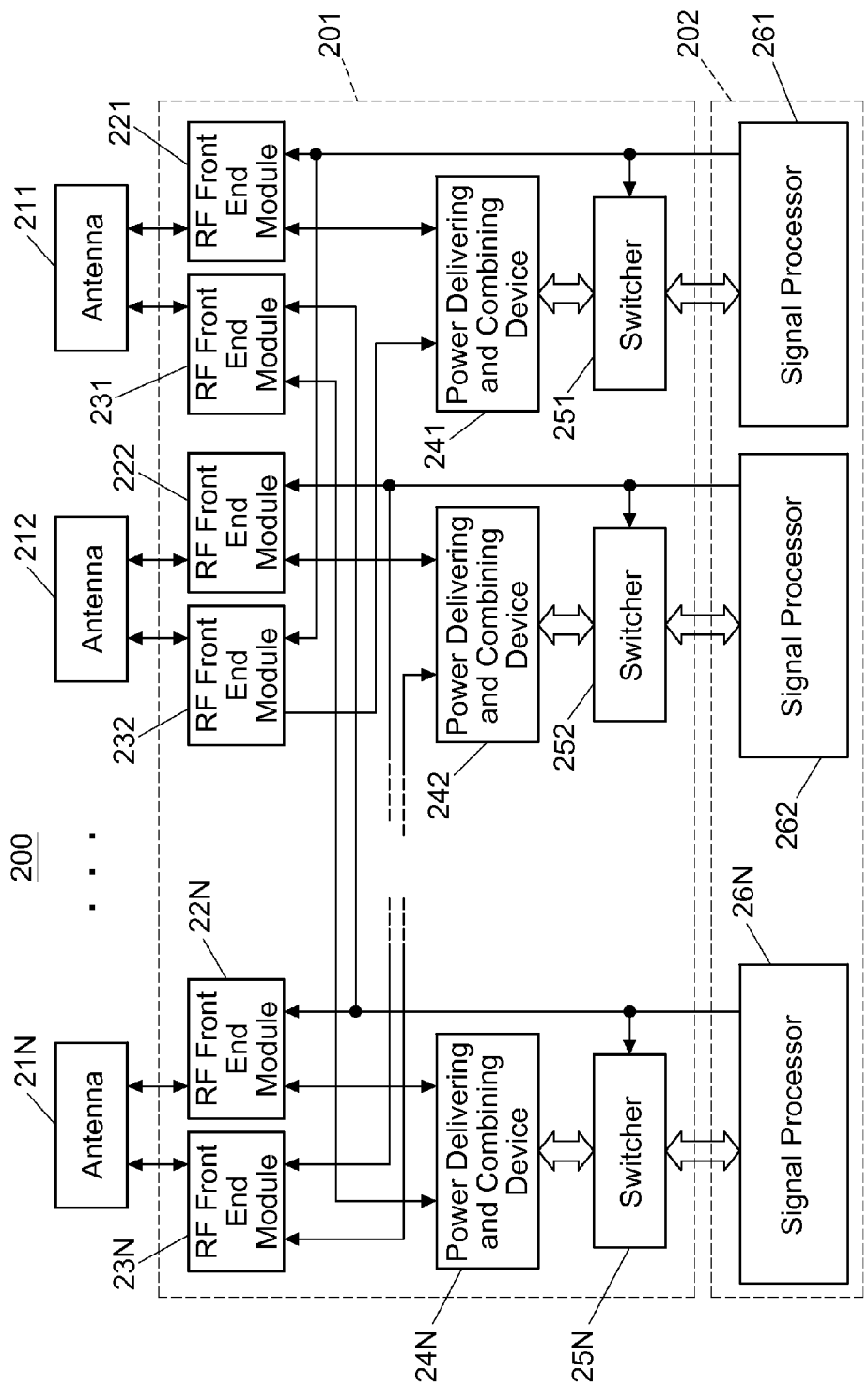
FIG. 2 is an illustration of a structure of a wireless communication system of an embodiment according to the present disclosure.

According to the abovementioned wireless communication system, the disclosure further provides an embodiment, so that users can expand the system according to needs. FIG. 2 shows a structure of a wireless communication system of an embodiment. A wireless communication system 200 is an expanded application of FIG. 1, it comprises antennas 211 to 21N, an expansion module 201 and a data processing unit 202, N is a constant bigger than 1. The data processing unit 202 includes signal processors 261 to 26N.

The expansion module 201 includes radio frequency (RF) front end modules 221 to 22N, radio frequency (RF) front end modules 231 to 23N, power dividing and combining devices 241 to 24N, as well as switchers 251 to 25N. The radio frequency (RF) front end modules 221 and 231 are connected to the antenna 211, the radio frequency (RF) front end modules 222 and 232 are connected to the antenna 212. The radio frequency (RF) front end modules 22$i$ (not illustrated) and 23$i$ (not illustrated) are connected to the antenna 21$i$ (not illustrated), while the radio frequency (RF) front end modules 22N and 23N are connected to the antenna 21N, i is a constant from 1 to N.

The power dividing and combining device 241 is connected to the radio frequency (RF) front end modules 221 and 232, the power dividing and combining device 24$i$ (not illustrated) is connected to the radio frequency (RF) front end modules 22$i$ (not illustrated) and 23($i$+1) (not illustrated), the power dividing and combining device 24N is connected to the radio frequency (RF) front end modules 22N and 231. The switcher 251 is connected to the power dividing and combining device 241 and the signal processor 261, the switcher 252 is connected to the power dividing and combining device 242 and the signal processor 262, the switcher 25$i$ (not illustrated) is connected to the power dividing and combining device 24$i$ (not illustrated) and the signal processor 26$i$, the switcher 25N is connected to the power dividing and combining device 24N and the signal processor 26N.

Since the number of the signal channels provided is twice of the antennas for expanding the MIMO system, by using the infrastructure of the expansion module, each of the signal processors can process two sets of signals with different polarizations corresponding to different antennas, so that it is not necessary to double the quantity of the complex signal processors as the number of the signal interfaces is increased by twice. Accordingly, the complexity of the system infrastructure is reduced. Furthermore, a simplified combination of the radio frequency (RF) front end modules is used to process the sub-signals received, so that N independent airspaces can be divided for the antennas, and N sets of 2×2 MIMO wireless communication systems are formed for practical applications. Under the receiving mode, signals in each of the independent airspaces are received via a first polarized and a second polarized antenna units of the antenna, and received by two different signal processors respectively via the expansion module for processing the received signals. In addition, under the transmitting mode and via the expansion module, the signals from the two different signal processors are respectively received by the first polarized and the second polarized antenna units of the antenna facing that airspace for transmitting. Via an infrastructure provided by the present disclosure, a conventional N×N multiple input and multiple output wireless communication system is converted into N sets of 2×2 multiple input and multiple output wireless communication systems, so that the N×N multiple input and multiple output wireless communication system is expanded into a 2N×2N multiple input and multiple output wireless communication system.

Note that the specifications relating to the above embodiments should be construed as exemplary rather than as limitative of the present disclosure, with many variations and modifications being readily attainable by a person of average skill in the art without departing from the spirit or scope thereof as defined by the appended claims and their legal equivalents.

What is claimed is:

1. An expansion module applicable to a multiple input and multiple output wireless communication system for simultaneously transmitting or receiving N sub-signals with a first direction of polarization and N sub-signals with a second direction of polarization via N antennas, N being a constant bigger than 1, the expansion module comprising:
   N first radio frequency front end modules, each of the first radio frequency front end modules being connected to one of the antennas for selectively processing one of the sub-signals with the first direction of polarization, or processing one of the sub-signals with the second direction of polarization;
   N second radio frequency front end modules, each of the second radio frequency front end modules being connected to one of the antennas for selectively process one of the sub-signals with the first direction of polarization, or processing one of the sub-signals with the second direction of polarization;
   N power dividing and combining devices, an ith power dividing and combining device being connected to the ith first radio frequency front end module and the (i+1)th second radio frequency front end module, the Nth power dividing and combining device is connected to the Nth first radio frequency front end module and the 1st second radio frequency front end module for allocating or integrating the corresponding sub-signals respectively, and i being a constant between 1 and N; and
   N switchers, each of the switchers being correspondingly connected to one of the power dividing and combining devices for selectively transmitting or receiving the corresponding sub-signals.

2. The expansion module as claimed in claim 1, wherein the ith first radio frequency front end module and the ith second radio frequency front end module are connected to the ith antenna.

3. The expansion module as claimed in claim 1, wherein each of the antennas has two interfaces for simultaneously transmitting or receiving the sub-signals.

4. The expansion module as claimed in claim 3, wherein the antennas are dual port orthogonal polarized antennas.

5. A multiple input and multiple output wireless communication system, comprising:
- N antennas, each of the antennas being used for simultaneously transmitting or receiving a sub-signal with a first direction of polarization and a sub-signal with a second direction of polarization, N being a constant bigger than 1;
- N first radio frequency front end modules, each of the first radio frequency front end modules being connected to one of the antennas for selectively processing one of the sub-signals with the first direction of polarization, or processing one of the sub-signals with the second direction of polarization;
- N second radio frequency front end modules, each of the second radio frequency front end modules being connected to one of the antennas for selectively processing one of the sub-signals with the first direction of polarization, or processing one of the sub-signals with the second direction of polarization;
- N power dividing and combining devices, an ith power dividing and combining device being connected to the ith first radio frequency front end module and the (i+1)th second radio frequency front end module, the Nth power dividing and combining device is connected to the Nth first radio frequency front end module and the 1st second radio frequency front end module, and i being a constant between 1 and N;
- N switchers, each of the switchers being correspondingly connected to one of the power dividing and combining devices selectively transmitting or receiving the corresponding sub-signals; and
- a data processing unit connected to the expansion module to provide N control signals for the expansion module for controlling the wireless communication system being selectively operated under the receiving mode or the transmitting mode, the data processing unit including N signal processors for processing the sub-signals.

6. The wireless communication system as claimed in claim 5, wherein the ith first radio frequency front end module and the ith second radio frequency front end module are connected to the ith antenna.

7. The wireless communication system as claimed in claim 5, wherein the ith signal processor is connected to the ith switcher.

8. The wireless communication system as claimed in claim 5, wherein the ith control signal controls the ith switcher, the ith first radio frequency front end module and the (i+1)th second radio frequency front end module, and the Nth control signal controls a Nth switcher, the Nth first radio frequency front end module and the 1st second radio frequency front end module.

9. The wireless communication system as claimed in claim 5, wherein each of the antennas has two interfaces for simultaneously transmitting or receiving the sub-signals.

10. The wireless communication system as claimed in claim 9, wherein the antennas are dual port orthogonal polarized antennas.

* * * * *